United States Patent
Friberg

(10) Patent No.: US 11,407,092 B2
(45) Date of Patent: Aug. 9, 2022

(54) ELECTRIC PULSE TOOL

(71) Applicant: ATLAS COPCO INDUSTRIAL TECHNIQUE AB, Stockholm (SE)

(72) Inventor: John Robert Christian Friberg, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 17/278,206

(22) PCT Filed: Sep. 2, 2019

(86) PCT No.: PCT/EP2019/073336
§ 371 (c)(1),
(2) Date: Mar. 19, 2021

(87) PCT Pub. No.: WO2020/057953
PCT Pub. Date: Mar. 26, 2020

(65) Prior Publication Data
US 2021/0347020 A1    Nov. 11, 2021

(30) Foreign Application Priority Data

Sep. 21, 2018   (SE) .................................. 1830263-8

(51) Int. Cl.
*B25B 23/147* (2006.01)
*B23P 19/06* (2006.01)
*B25B 21/02* (2006.01)

(52) U.S. Cl.
CPC ........ *B25B 23/1475* (2013.01); *B23P 19/065* (2013.01); *B25B 21/02* (2013.01)

(58) Field of Classification Search
CPC . B25B 23/1475; B25B 21/02; B25B 23/1405; B25B 23/147; B25B 21/00;
(Continued)

(56) References Cited

U.S. PATENT DOCUMENTS 4,095,325 A * 6/1978 Hashimoto ........... B25B 23/147
29/446
4,104,778 A * 8/1978 Vliet ................... B25B 23/1456
173/183
(Continued)

FOREIGN PATENT DOCUMENTS

CN      108136571 B    10/2020
WO    2018137928 A1     8/2018

OTHER PUBLICATIONS

Chinese Office Action dated Mar. 9, 2022, issued in counterpart Chinese Application No. 201980061607.1.
(Continued)

*Primary Examiner* — Dariush Seif
(74) *Attorney, Agent, or Firm* — Holtz, Holtz & Volek PC

(57) ABSTRACT

An electric pulse tool performs a tightening operation in which torque is delivered in pulses to tighten a screw joint. The electric pulse tool includes an output shaft, a torque sensor to determine a torque value associated with tightening of the screw joint, and an angle sensor to determine an angular displacement of the screw joint. The tool provides low torque pulses of a torque value of less than 15 percent of an electric pulse tool max torque value on the output shaft until a low threshold torque value is reached. Next the tool starts measuring an angular displacement of an element of the screw joint and provides tightening torque pulses of a torque value of more than 15 percent of the electric pulse tool max torque value on the output shaft. The tool stops providing torque pulses on the output shaft when a target parameter is reached.

13 Claims, 3 Drawing Sheets

(58) Field of Classification Search
CPC ... B25B 21/026; B25B 23/14; B25B 23/1425;
B25B 21/008; B25B 23/1453; B25B
23/1456; B23P 19/065; B23B 2260/128;
B25D 2250/221; B25D 16/006; B25D
2216/0023; B25D 2216/0015
USPC .................. 173/2, 176, 93, 48, 179, 217
See application file for complete search history.

(56) References Cited

U.S. PATENT DOCUMENTS

| | | | | |
|---|---|---|---|---|
| 4,173,059 | A * | 11/1979 | Hashimoto | B25B 23/147 81/469 |
| 5,172,616 | A * | 12/1992 | Negishi | B25B 23/1425 81/479 |
| 5,476,014 | A * | 12/1995 | Lampe | G01P 15/00 73/862.21 |
| 5,848,655 | A * | 12/1998 | Cooper | B25B 21/00 173/183 |
| 6,371,218 | B1 * | 4/2002 | Amano | B25B 23/1405 173/183 |
| 7,082,866 | B2 * | 8/2006 | Becker | B25B 23/1425 81/479 |
| 8,171,828 | B2 * | 5/2012 | Duvan | B25B 23/1425 73/862.27 |
| 8,418,778 | B2 * | 4/2013 | Eshleman | B25F 5/00 173/183 |
| 8,918,292 | B2 * | 12/2014 | Wener | G01B 5/24 702/41 |
| 9,579,783 | B2 * | 2/2017 | Wirnitzer | B25F 5/00 |
| 9,700,970 | B2 * | 7/2017 | Lee | B25B 23/14 |
| 10,882,166 | B2 * | 1/2021 | Asplund | B25B 23/1475 |
| 2003/0090227 | A1 * | 5/2003 | Ito | B25B 23/1405 318/434 |
| 2003/0173096 | A1 * | 9/2003 | Setton | B25B 23/147 173/176 |
| 2004/0182588 | A1 * | 9/2004 | Tokunaga | B25B 23/1453 173/176 |
| 2005/0045353 | A1 * | 3/2005 | Kawai | B25B 21/02 173/183 |
| 2005/0061119 | A1 * | 3/2005 | Becker | B25B 23/1425 81/467 |
| 2005/0109519 | A1 * | 5/2005 | Kawai | B25B 21/026 173/183 |
| 2008/0131228 | A1 * | 6/2008 | Sheets | B25B 23/14 702/42 |
| 2008/0178713 | A1 * | 7/2008 | Long | B25B 23/14 73/862.21 |
| 2009/0078057 | A1 * | 3/2009 | Schultz | B25B 23/1425 73/862.23 |
| 2009/0101379 | A1 * | 4/2009 | Du | H02P 7/29 173/176 |
| 2009/0139738 | A1 * | 6/2009 | Lippek | B25B 23/14 173/183 |
| 2011/0079407 | A1 * | 4/2011 | Iimura | B25B 23/1405 173/217 |
| 2011/0185863 | A1 * | 8/2011 | Hsieh | B25B 23/142 81/479 |
| 2011/0303054 | A1 * | 12/2011 | Cattaneo | B25B 23/1425 81/479 |
| 2013/0133912 | A1 * | 5/2013 | Mizuno | B25B 23/1405 173/180 |
| 2014/0102741 | A1 * | 4/2014 | Sekino | B25B 21/02 173/181 |
| 2014/0262390 | A1 * | 9/2014 | Arimura | H02P 7/295 173/7 |
| 2015/0021062 | A1 * | 1/2015 | Sekino | B25B 23/14 173/183 |
| 2015/0172788 | A1 * | 6/2015 | Wu | B25B 23/1425 340/870.01 |
| 2016/0116897 | A1 * | 4/2016 | Ando | G05B 15/02 700/275 |
| 2016/0325414 | A1 * | 11/2016 | Mizuno | B25B 23/1453 |
| 2016/0354905 | A1 * | 12/2016 | Ely | B25B 21/008 |
| 2018/0169842 | A1 * | 6/2018 | Wallgren | B25B 23/147 |
| 2018/0290275 | A1 * | 10/2018 | Asplund | B25B 23/1475 |
| 2019/0061075 | A1 * | 2/2019 | Hohmann | B25B 23/1456 |
| 2019/0091824 | A1 * | 3/2019 | Chellew | B25B 23/147 |
| 2019/0168362 | A1 * | 6/2019 | Klotblixt | B25B 23/1405 |
| 2019/0168364 | A1 * | 6/2019 | Klotblixt | B25B 21/00 |
| 2019/0232471 | A1 * | 8/2019 | Paoli | B25B 23/1453 |
| 2019/0275650 | A1 * | 9/2019 | Friberg | B25B 21/02 |
| 2020/0070326 | A1 * | 3/2020 | Yamaguchi | G01B 5/24 |
| 2020/0130152 | A1 * | 4/2020 | Parlow | B25B 23/14 |

OTHER PUBLICATIONS

International Search Report (ISR) dated Dec. 12, 2019 issued in International Application No. PCT/EP2019/073336.
Written Opinion dated Dec. 12, 2019 issued in International Application No. PCT/EP2019/073336.

* cited by examiner

ELECTRIC PULSE TOOL

The disclosure relates to an electric pulse tool and a method in an electric pulse tool for performing tightening operations where torque is delivered in pulses to tighten and/or loosen screw joints.

BACKGROUND

During a tightening operation, in which a pulse tool is used for tightening a screw joint, torque is applied to the screw joint in pulses by a motor housed inside the electric pulse tool. Often it is desired to control the tightening such that a specific torque or clamp force is installed into the joint. The applied torque may be monitored by a torque sensor.

It is often important to achieve high productivity and accuracy when using pulse tools. For instance when the pulse tool is used in production productivity it is important in order to shorten the time used to produce each unit. Therefore the pulse tool is often adapted to tighten screw joints as fast as possible.

One solution to increase the accuracy is to reduce the power of torque pulses towards the end of the tightening.

For hand held power tools it is important both that the reaction force that is subjected to the operator is as low as possible and that the accuracy of the concluded tightening is as high as possible.

An accurate tightening typically implies that the clamp force installed into the screw joint is as accurate as possible. The clamp force in the screw joint is however typically not measured. Instead the torque is measured, which gives an indication how much clamp force that have been installed into the joint.

However, measuring the torque is for some screw joints an inaccurate method of estimating the clamp force. This since the friction can vary between joints and therefore a torque measure will not always give a correct estimate of the clamp force.

Therefore it is often a desired to also measure the angular displacement of an element of the screw joint in order to get an estimate of the clamp force installed into the joint. Measuring the angular displacement of an element of the screw joint is however difficult with pulse tools. This since each pulse from the pulse tool will result in a substantially angular displacement of the screw joint.

Hence, there is a need for a pulse tool that is adapted to accurately measure the angular displacement of an element of the screw joint during a tightening operation.

SUMMARY OF THE DISCLOSURE

One problem with prior art pulse tools is that they only can provide torque pulses of a magnitude that is too high in order to accurately measure the angular displacement of an element of the joint. This since each pulse from the pulse tool will result in a substantially angular displacement of the screw joint.

An object of the present disclosure is to provide electric pulse tool for performing tightening operations, where torque is delivered in pulses to tighten a screw joint. The electric pulse tool comprises an output shaft, a torque sensor arranged to determine a torque value associated with the tightening of the screw joint and an angle sensor arranged to determine an angular displacement of the screw joint. Whereby the electrical pulse tool is operative to provide low torque pulses of a torque value of less than 15 per cent of the electric pulse tool max torque value on the output shaft until a low threshold torque value is reached. Then start measuring an angular displacement of the screw joint when the low threshold torque value is reached. And provide tightening torque pulses of a torque value of more than 15 per cent of the electric pulse tool max torque value on the output shaft. And stop providing torque pulses on the output shaft when a target parameter of the tightening operation is reached.

Since the electrical pulse tool is operative to provide low torque pulses of a torque value of less than 15 per cent of the electric pulse tool max torque value until a low threshold torque value is reached it is possible to start measuring an angular displacement of the screw joint before a substantially angular displacement of the screw joint.

In accordance with a second aspect the disclosure relates a method in an electric pulse tool for performing tightening operations, where torque is delivered in pulses to tighten a screw joint, the electric pulse tool comprising: an output shaft; a torque sensor arranged to determine a torque value associated with the tightening of the screw joint; an angle sensor arranged to determine an angular displacement of the screw joint. Whereby the method comprises, providing low torque pulses of a torque value of less than 15 per cent of the electric pulse tool max torque value on the output shaft until a low threshold torque value is reached. Start to measure an angular displacement of the screw joint when the low threshold torque value is reached. Provide tightening torque pulses of a torque value of more than 15 per cent of the electric pulse tool max torque value on the output shaft. Next stop to provide torque pulses on the output shaft when a target parameter of the tightening operation is reached.

Further objects, features, and advantages of the present disclosure will appear from the following detailed description, wherein some aspects of the disclosure will be described in more detail with reference to the accompanying drawings, in which.

DETAILED DESCRIPTION OF THE SHOWN EMBODIMENT OF THE DISCLOSURE

Figure 1:
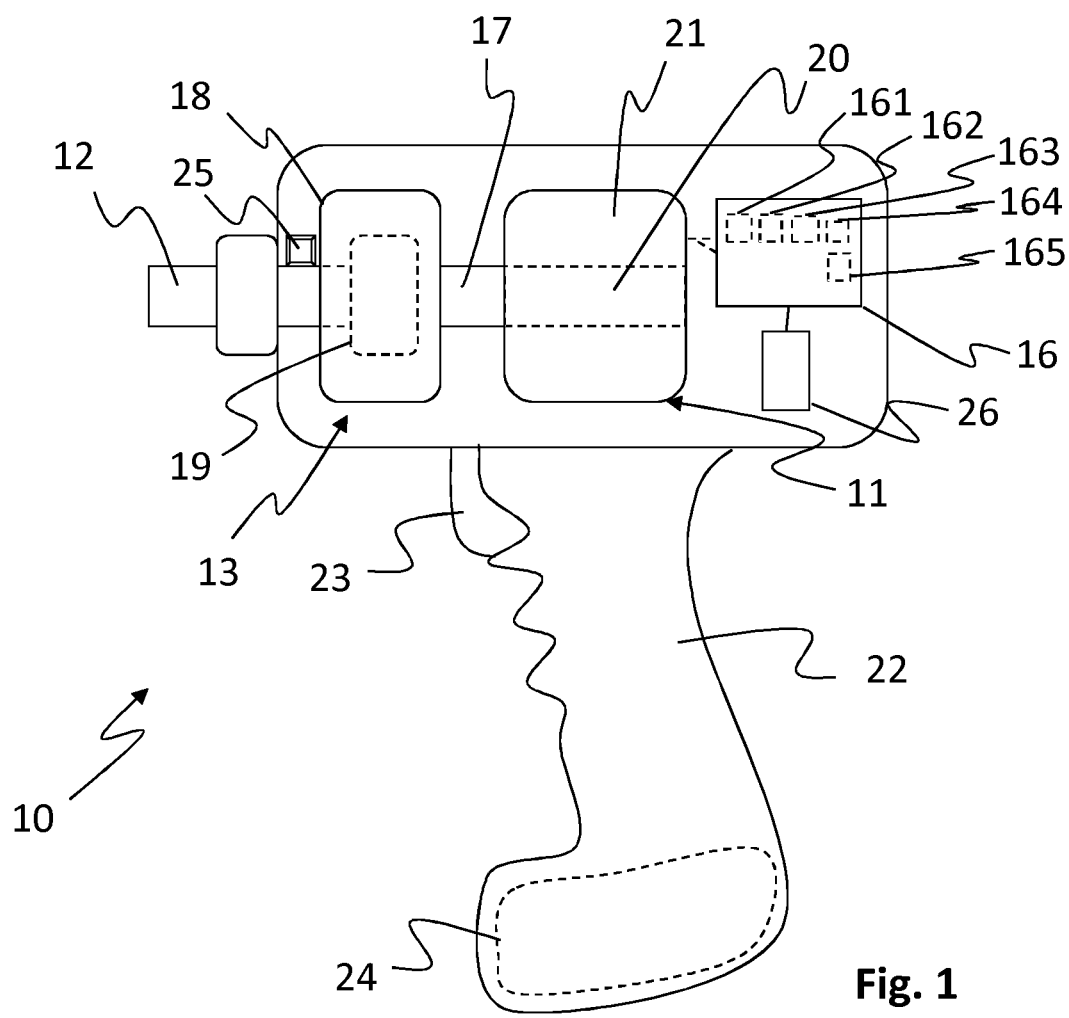
FIG. 1 is a schematic representation of an electric pulse tool according to an exemplary embodiment of the disclosure.

Aspects of the present disclosure will be described more fully hereinafter with reference to the accompanying drawings. The device, method and computer program disclosed herein can, however, be realized in many different forms and should not be considered as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In FIG. 1 an electric pulse tool 10 in accordance with a specific embodiment of the disclosure is schematically shown. The electrical pulse tool 10 is configured to perform tightening operations where torque is delivered in pulses to tighten screw joints. For this purpose the electrical pulse tool 10 comprises a bidirectional electric motor 11 which is arranged to deliver torque in two opposite rotational directions, i.e. clockwise and counter clockwise.

The hand held electric pulse tool 10 further comprises a handle 22, which is of a pistol type in the shown embodiment. The disclosure is however intended to cover any type of pulse tools. A power supply 24, such as a battery, is arranged in the lower part of the handle and a trigger 23 is arranged for manipulation of the operator so as to power the electric motor 11. The power supply may also be a connection to an electric cable.

Further, the electric pulse tool comprises an output shaft 12 and a torque sensor 25 arranged to determine a torque value associated with the tightening of the screw joint. The electric pulse tool 10 further comprises an angle sensor arranged to determine an angular displacement of the screw joint.

The shown embodiment further comprises a pulse unit 13 comprising an inertia body 18 that houses a piston activated rotator 19. The inertia body 18 is rigidly connected to the input shaft 17 and driven by a rotor 20 of the motor 11. The rotor 20 is in the shown embodiment arranged coaxially inside a stator 21 of the motor 11. A pulse is generated as cam surfaces (not shown) on the inside of the inertia body 18 interacts with the pistons so as to force the rotator 19 to rotate in a conventional manner well known in the art.

The disclosure is however not limited to electric pulse tools with a pulse unit. Pulses may also be produced in electric pulse tools with a direct connection between the motor and the output shaft by pulsing the output of the motor of the electric pulse tool. The disclosure also covers such electric pulse tools.

An object of the present disclosure is to provide an electrical pulse tool 10 that accurately can measure the angular displacement of an element of the screw joint during a tightening operation. This object is achieved by an electrical pulse tool 10 that is operative to provide low torque pulses of a torque value of less than 15 per cent of the electric pulse 10 tool max torque value on the output shaft until a low threshold torque value is reached. Then the electrical pulse tool 10 starts to measure an angular displacement of the screw joint when the low threshold torque value is reached. By first providing low torque pulses of a torque value of less than 15 per cent of the electric pulse 10 tool max torque value, there will not be a significant angular displacement of an element of the screw joint. Since an element of the screw joint will not be turned so much by each low torque pulse the low threshold torque value will not be missed. It is therefore possible to start to measure the angular displacement of an element of the screw joint before an element of the screw joint has been turned significantly. Since the low torque pulses are of a torque value of less than 15 per cent of the electric pulse 10 tool max torque value, the low torque pulses will not significantly turn the element of the screw joint. Therefore the angular displacement of the element of the screw joint can be measured over a larger angular interval compared to if high torque pulses were used directly.

Thus this object is according to an exemplary embodiment of the disclosure achieved by the electric pulse tool being operative to provide low torque pulses of a torque value of less than 15 per cent of the electric pulse tool max torque value on the output shaft until a low threshold torque value is reached. Then the electric pulse tool being operative to provide tightening torque pulses of a torque value of more than 15 per cent of the electric pulse tool max torque value on the output shaft. Next the electrical pulse tool is operative to stop providing torque pulses on the output shaft when a target parameter of the tightening operation is reached.

By the hand held electric pulse tool being operative to, it means that the hand held electric pulse tool automatically provides the low torque pulses and tightening pulses according to the different embodiments when the trigger is actuated, without the operator pressing and releasing the actuator during a tightening operation.

In an exemplary embodiment of the present disclosure the electrical pulse tool 10 is further operative to drive the motor in a pulsed manner to provide pulses on the output shaft 12. According to another exemplary embodiment of the present disclosure the motor is driven continuously, and the pulses are provided by a pulse unit between the motor and the output shaft.

In yet another exemplary embodiment of the present disclosure the low threshold torque value is less than 10 per cent of the electric pulse tool max torque value. By first providing low torque pulses of a torque value of less than 10 per cent of the electric pulse 10 tool max torque value, there will be even less angular displacement of an element of the screw joint. Since an element of the screw joint will be turned even less by each low torque pulse the low threshold torque value will not be missed. It is therefore possible to start to measure the angular displacement of an element of the screw joint earlier compared to if a higher value torque pulses were used. Therefore the angular displacement of the element of the screw joint can be measured over a large angular interval of the total angular displacement compared to if torque pulses with higher torque were used.

In another exemplary embodiment of the present disclosure the torque value of the low torque pulses are less than 5 per cent of the electric pulse tool max torque value. By first providing low torque pulses of a torque value of less than 5 per cent of the electric pulse 10 tool max torque value, there will be even less angular displacement of an element of the screw joint. Since an element of the screw joint will be turned even less by each low torque pulse the total angular displacement can be more accurately measured. It is therefore possible to start to measure the angular displacement of an element of the screw joint earlier compared to if a higher value torque pulses were used compared to if torque pulses with higher torque were used.

In yet another exemplary embodiment of the present disclosure the torque value of the tightening torque pulses are the electric pulse tool max torque value.

According to one exemplary embodiment the target parameter of the tightening operation is torque.

Referring back to FIG. 1, the electric pulse tool 10 further comprise a processor 16 arranged to control the electric motor 11. The electric pulse tool 10 also comprises a memory 26 containing instructions executable by the processor 16. The processor 16 is a Central Processing Unit, CPU, microcontroller, Digital Signal Processor, DSP, or any other suitable type of processor capable of executing computer program code. The memory 26 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the hand held electric pulse tool 10 causes the hand held electric pulse tool 10, 32 to perform any of the aspects of the disclosure described herein.

When the above-mentioned computer program code is run in the processor 16 of the electric pulse tool 10 it causes the electric pulse tool 10 to be operative to provide low torque pulses of a torque value of less than 15 per cent of the electric pulse tool max torque value on the output shaft until a low threshold torque value is reached. And further start measuring an angular displacement of the screw joint when the low threshold torque value is reached. Then provide tightening torque pulses of a torque value of more than 15 per cent of the electric pulse tool max torque value on the output shaft. Next stop providing torque pulses on the output shaft when a target parameter of the tightening operation is reached.

According to one aspect of the disclosure the processor 16 comprises one or several of:
- a first providing module 161 adapted to provide low torque pulses of a torque value of less than 15 per cent of the electric pulse tool max torque value on the output shaft until a low threshold torque value is reached;
- a starting module 162 adapted to start measuring an angular displacement of the screw joint when the low threshold torque value is reached;
- a second providing module 163 adapted to provide tightening torque pulses of a torque value of more than 15 per cent of the electric pulse tool max torque value on the output shaft;
- a stopping module 164 adapted to stop providing torque pulses on the output shaft when a target parameter of the tightening operation is reached.

The first providing module 161, the starting module 162, the second providing module 163, and the stopping module 164 are implemented in hardware or in software or in a combination thereof. The modules 161, 162, 163, and 164 are according to one aspect implemented as a computer program stored in the memory 26 which run on the processor 16. The electric power tool 10 is further configured to implement all the aspects of the disclosure as described herein.

Figure 2:
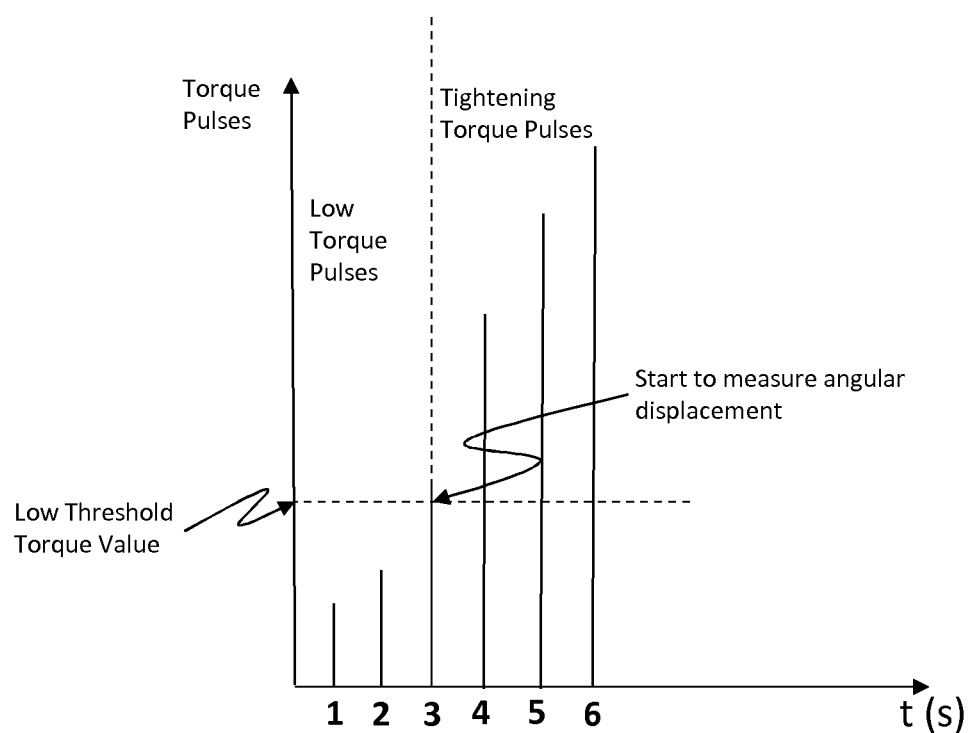
FIG. 2 is a schematic representation of the torque pulses as a function of operation time in an example of a tightening performed by the electric pulse tool.

One example of a tightening performed by the electric pulse tool 10 according to an exemplary embodiment is illustrated in FIG. 2. In FIG. 2 the torque value of the torque pulses illustrated as a function of time t. In this example the tightening operation is illustrated as comprising 6 torque pulses 1-6. The tightening operation can however require fewer or more torque pulses. Each torque pulse will add torque and thus increase the parameter associated with the tightening of the screw joint. As can be seen in FIG. 2 the electric pulse tool 10 provides low torque pulses 1 to 3 of a torque value of less than 15 per cent of the electric pulse tool max torque value on the output shaft 12 until the low threshold torque value is reached. Next the electric pulse tool 10 starts to measure the angular displacement of an element of the screw joint and provides torque pulses 4 to 6 on the output shaft 12 of a torque value of more than 15 per cent of the electric pulse tool max torque value.

In the tightening illustrated in FIG. 2, the hand held electric pulse tool 10 thus first provides low torque pulses until low threshold torque value is reached. Then provides tightening torque pulses until the target parameter of the tightening operation is reached.

Figure 3:
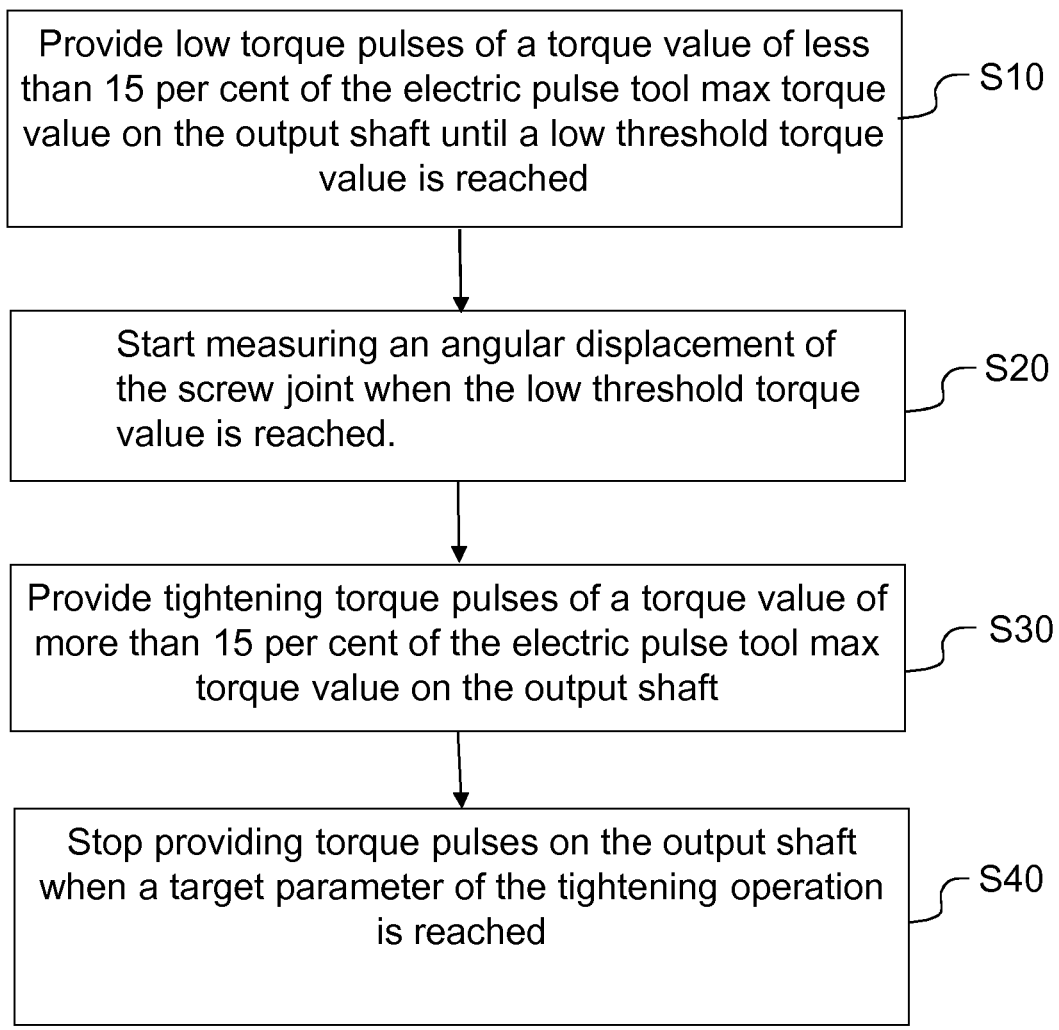
FIG. 3 is a flow chart illustrating exemplary embodiments of the methods performed in the electric pulse tool.

FIG. 3 illustrates the steps in a method, performed in the electric pulse tool 10 according to the above described exemplary embodiments.

In a first step S10 the electric pulse tool 10 provides low torque pulses of a torque value of less than 15 per cent of the electric pulse tool max torque value on the output shaft until a low threshold torque value is reached. In a next step S20 the electric pulse tool 10 start measuring an angular displacement of the screw joint when the low threshold torque value is reached. Thereafter in a next step S30 the electric pulse tool 10 provide tightening torque pulses of a torque value of more than 15 per cent of the electric pulse tool max torque value on the output shaft. In a next step S40 the electric pulse tool 10 stop providing torque pulses on the output shaft when a target parameter of the tightening operation is reached.

According to one exemplary embodiment of the method, the motor is driven in a pulsed manner to provide pulses on the output shaft 12.

In another exemplary embodiment of the method, the motor is driven continuously and wherein the pulses are provided by a pulse unit between the motor and the output shaft.

According to another exemplary embodiment of the method, the low threshold torque value is between 5 and 20 per cent of the electric pulse tool max torque value. In a yet another exemplary embodiment of the method, the torque value of the low torque pulses are less than 10 per cent of the electric pulse tool max torque value. According to another exemplary embodiment of the method, the torque value of the tightening torque pulses are the electric pulse tool max torque value.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. An electric pulse tool for performing a tightening operation in which torque is delivered in pulses to tighten a screw joint, the electric pulse tool comprising:
    an output shaft;
    a torque sensor configured to determine a torque value associated with tightening of the screw joint;
    an angle sensor configured to determine an angular displacement of the output shaft; and
    a processor configured to control the electric pulse tool to:
    provide low torque pulses of a torque value of less than 15 percent of an electric pulse tool max torque value on the output shaft until a low threshold torque value is reached;
    start measuring an angular displacement of the output shaft when the low threshold torque value is reached;
    provide tightening torque pulses of a torque value of more than 15 percent of the electric pulse tool max torque; and
    stop providing torque pulses on the output shaft when a target parameter of the tightening operation is reached.

2. The electric pulse tool according to claim 1, further comprising a motor that the processor drives in a pulsed manner to provide the torque pulses on the output shaft.

3. The electric pulse tool according to claim 1, further comprising:
    a motor which is configured to be driven continuously; and a pulse unit arranged between the motor and the output shaft to provide the torque pulses on the output shaft.

4. The electric pulse tool according to claim 1, wherein the low threshold torque value is between 5 to 10 percent of the electric pulse tool max torque value.

5. The electric pulse tool according to claim 1, wherein the torque value of the tightening torque pulses is the electric pulse tool max torque value.

6. The electric pulse tool according to claim 1, wherein the target parameter of the tightening operation is torque.

7. A method of controlling an electric pulse tool for performing a tightening operation in which torque is delivered in pulses to tighten a screw joint, wherein the electric pulse tool includes an output shaft, a torque sensor configured to determine a torque value associated with tightening of the screw joint, and an angle sensor configured to determine an angular displacement of the output shaft, the method comprising:
providing low torque pulses of a torque value of less than 15 percent of an electric pulse tool max torque value on the output shaft until a low threshold torque value is reached;
starting to measure an angular displacement of the output shaft when the low threshold torque value is reached;
providing tightening torque pulses of a torque value of more than 15 percent of the electric pulse tool max torque value on the output shaft; and
stopping to provide torque pulses on the output shaft when a target parameter of the tightening operation is reached.

8. The method according to claim 7, further comprising driving a motor of the electric pulse tool in a pulsed manner to provide the torque pulses on the output shaft.

9. The method according to claim 7, further comprising driving a motor of the electric pulse tool continuously, wherein the torque pulses are provided by a pulse unit arranged between the motor and the output shaft.

10. The method according to claim 7, wherein the torque value of the low torque pulses is less than 10 percent of the electric pulse tool max torque value.

11. The method according to claim 7, wherein the torque value of the tightening torque pulses is the electric pulse tool max torque value.

12. The method according to claim 7, wherein the target parameter of the tightening operation is torque.

13. A non-transitory computer-readable storage medium having stored thereon a computer program which is executable by a computer of an electric pulse tool, wherein the electric pulse tool includes an output shaft, a torque sensor configured to determine a torque value associated with tightening of the screw joint, and an angle sensor configured to determine an angular displacement of the output shaft, the program being executable by the computer to control the electric pulse tool to perform operations comprising:
providing low torque pulses of a torque value of less than 15 percent of an electric pulse tool max torque value on the output shaft until a low threshold torque value is reached;
starting to measure an angular displacement of the output shaft when the low threshold torque value is reached;
providing tightening torque pulses of a torque value of more than 15 percent of the electric pulse tool max torque value on the output shaft; and
stopping to provide torque pulses on the output shaft when a target parameter of the tightening operation is reached.

* * * * *